US008089520B2

(12) United States Patent
Ko et al.

(10) Patent No.: US 8,089,520 B2
(45) Date of Patent: Jan. 3, 2012

(54) REMOTE MONITORING METHOD USING MOBILE TERMINAL AND SYSTEM THEREOF

(75) Inventors: Kwang-jin Ko, Seoul (KR); Jaeyong Lee, Seoul (KR); Jong-deuk Kim, Seoul (KR)

(73) Assignee: Vidiator Enterprises Inc., New Providence (BS)

( * ) Notice: Subject to any disclaimer, the term of this patent is extended or adjusted under 35 U.S.C. 154(b) by 771 days.

(21) Appl. No.: 11/884,193

(22) PCT Filed: Feb. 10, 2006

(86) PCT No.: PCT/US2006/004897
§ 371 (c)(1),
(2), (4) Date: Sep. 23, 2008

(87) PCT Pub. No.: WO2006/086718
PCT Pub. Date: Aug. 17, 2006

(65) Prior Publication Data
US 2009/0021585 A1    Jan. 22, 2009

(30) Foreign Application Priority Data

Feb. 11, 2005   (KR) .................. 10-2005-0011675

(51) Int. Cl.
*H04N 5/232* (2006.01)
*H04N 5/225* (2006.01)

(52) U.S. Cl. ............ 348/211.1; 348/207.11; 348/E7.07; 725/105

(58) Field of Classification Search ............... 348/211.8, 348/211.13, 207.1, 207.11, 207.99; 725/105
See application file for complete search history.

(56) References Cited

U.S. PATENT DOCUMENTS

| 6,166,729 | A  | * | 12/2000 | Acosta et al. ............. 715/719 |
| 6,271,752 | B1 |   | 8/2001  | Vaios |
| 6,698,021 | B1 |   | 2/2004  | Amini et al. |
| 7,257,832 | B2 | * | 8/2007  | Beane et al. ............. 725/105 |
| 7,373,395 | B2 | * | 5/2008  | Brailean et al. .......... 709/219 |
| 7,562,380 | B2 | * | 7/2009  | Negishi et al. ........... 725/105 |
| 7,881,855 | B2 | * | 2/2011  | Damitz et al. ............ 701/104 |

(Continued)

FOREIGN PATENT DOCUMENTS

FR    2 849 738 A1    7/2004

(Continued)

OTHER PUBLICATIONS

Summons to attend oral proceedings for EP Application 06720658.1, mailed on Dec. 8, 2010, 7 pages.

(Continued)

*Primary Examiner* — Hung Lam
(74) *Attorney, Agent, or Firm* — Schwabe, Williamson & Wyatt, P.C.

(57) ABSTRACT

A remote monitoring method and system enables the moving picture data being captured at Place 1 to be monitored remotely at Place 2 real time, and more particularly for example to a method and a system, wherein the moving pictures are taken with a web camera installed on the computer (PC, in general) at Place 1 and, upon request for receiving the contents of the moving pictures through the Mobile Browser (WAP or WEB pages) on the mobile VOD (Video On Demand) terminal at Place 2, the moving picture data are remotely monitored at the VOD Terminal Client by way of the streaming server.

16 Claims, 8 Drawing Sheets

U.S. PATENT DOCUMENTS

2004/0086091 A1* 5/2004 Naidoo et al. ............... 379/37
2006/0120385 A1* 6/2006 Atchison et al. ............ 370/400

FOREIGN PATENT DOCUMENTS

GB  2 357 387 A  6/2001
WO  03/040995 A2  5/2003

OTHER PUBLICATIONS

International Search Report and Written Opinion for Application PCT/US2006/004897, mailed Jun. 14, 2006, 11 pages.

International Preliminary Report on Patentability for Application PCT/US2006/004897, mailed Aug. 6, 2007, 14 pages.

Office Action for EP Application 06720658.1, mailed Jul. 24, 2008, 6 pages.

Office Action for MX Application MX/A/2007/009701, mailed Oct. 9, 2009, 2 pages.

Office Action for CN Application 2006800044910, mailed May 15, 2009, 9 pages.

Office Action for CN Application 2006800044910, mailed Jan. 29, 2010, 6 pages.

* cited by examiner

REMOTE MONITORING METHOD USING MOBILE TERMINAL AND SYSTEM THEREOF

TECHNICAL FIELD

The present disclosure relates to a technology of remote monitoring method and system that enables the moving picture data being captured at Place 1 to be monitored remotely at Place 2 real time, and more particularly to a method and a system, wherein the moving pictures are taken with a web camera installed on the computer (PC, in general) at Place 1 and, upon request for receiving the said contents of the moving pictures through the mobile VOD (Video On Demand) terminal at Place 2, the moving picture data are remotely monitored at the VOD terminal client by way of the streaming server.

BACKGROUND INFORMATION

Currently, the Internet is achieving explosive growth thanks to the development and improvement of technology associated with the WWW. There are as many as hundreds of millions of Internet users around the world. Based on such improvement, the users are demanding the capability of processing not only the simple text-based data but also a variety of media data on the web. Under such circumstances, the technology of processing and transmitting the media data in a wireless environment is evolving into another phase, coupled with wide distribution of the wireless terminals and improvement of a wireless Internet technology. In particular, it has recently become possible to stream various media contents, which are supplied from the CP (Contents Provider) Server, on the cellular phone or PDA using mobile terminals such as a cellular phone or a PDA (Personal Digital Assistant).

However, it is common that the companies operating the CP Server or the companies providing the contents to the CP Server create the streaming-enabled moving picture contents at the mobile terminal. Thus, creation of the contents has been separated from the use of the contents with a mobile terminal and, even though an individual created the contents, that individual was not designated as the direct content provider as well as the user simultaneously, or creation and use of the contents did not occur in real time.

In addition, a real-time remote monitoring system that uses an existing camera was enabled by communication of the moving pictures taken by the camera among the CCTV monitors, but the distance was limited due to difficulty in installation and high costs. So, the system had a problem in that it was enabled only inside a certain building. Also, the individual could not become the subject of remote monitoring.

BRIEF SUMMARY OF THE INVENTION

One embodiment of the present invention provides a remote monitoring method that enables a user to see in real time the moving pictures being taken (Live Casting) at the moment by a web camera anytime, anywhere regardless of the distance to the place where the web camera is installed. To fulfill this, the inventor of the present invention presupposed consolidation of the mobile communications network holding a wide Internet network and numerous subscribers.

Another embodiment of the present invention provides a remote monitoring method that is appropriate for the personal environment of the user, thereby implementing a high-level personal environment with the application of the technology that allows the mobile communication subscriber to access wireless Internet through his/her cellular phone or PDA to get the streaming moving picture that is being monitored in order to ensure easy accessibility, with the use of the easy-to-install web cameras and personal computers and with the use of the applications having various convenience modules.

In addition, from the standpoint of creating and using the contents, an embodiment of the present invention enables creation and use of the contents to be done real time by a particular individual. We would like to provide a remote monitoring method capable of creating the contents with a variety of uses including remote monitoring of pet animals, store floor surveillance system, surveillance of kids in pre-school/kindergarten, moving pictures for small-scale personal broadcasting and so on.

Furthermore, one embodiment of the present invention provides a system capable of implementing a remote monitoring method for set projects. Wide area Internet networks and mobile communications networks are consolidated in the system of an embodiment of the present invention. The inventors made an effort to design the configuration of the embodiments of the present invention to have the geographical concept of each terminal (computer/mobile terminal) in the entire system to be understood as an extended concept.

Other objectives and advantages of the embodiments of the present invention will be described below. We would like to add that the other objectives and advantages of the present invention will be accepted more widely not only by the matters described in the various embodiments and claims of the present invention, but also by the means and combinations that can be generated within the scope that can be easily considered, and it will correspond to the unique effect of the present invention.

An embodiment of the present invention, for the purpose of achieving such objectives, relates to a remote monitoring method through a mobile terminal using a remote monitoring application software, comprising:

The $1^{st}$ Step, wherein the remote monitoring application environment is implemented to a computer and initialized;

The $2^{nd}$ Step, wherein an object is shot with 1 or more web cameras connected to the computer and the moving pictures that are being shot are exposed to the computer monitor;

The $3^{rd}$ Step, wherein streaming links are created in the service-providing wireless Internet site to have streaming ready;

And the $4^{th}$ Step, wherein 1 or more mobile VOD terminals access said wireless Internet site as a streaming client to receive the moving pictures of said object in real time.

Also, it would be desirable for said $1^{st}$ Stage to include:

A step, wherein registration of memberships is done in the management server in accordance with already-set procedures;

A step, wherein the service-providing website with said remote monitoring application software that is embedded is accessed for downloading to a computer or said application is installed to the computer using a recording medium that stores said remote monitoring application software.

And a step, wherein said application is executed and an environment for monitoring is set.

Also, it is desirable that the step, wherein said monitoring environment is set up, includes setting up open/not open Y/N.

Also, it can be understood that, during said $2^{nd}$ Stage of an embodiment of the present invention, the object is shot in real time to generate the digital video/audio source which is converted into a streaming format with a real-time encoding (Encoding).

The main screen player, which includes the moving picture display domain of the object shot in real time, title domain of the channel, channel screen quality set-up domain, menu domain, monitoring start/complete domain, channel information correction domain, open/not open change domain, etc., is executed on the computer monitor to have the moving pictures that are being shot exposed on the computer monitor.

Also, it would be desirable for said $3^{rd}$ Stage to include:

A stage, wherein the shot moving picture sources are prepared for conversion into a streaming format and communication with the management server is connected;

A stage, wherein pages are generated on said wireless Internet site;

And a stage, wherein links of the streaming files are created on said wireless Internet page.

Furthermore, it would be desirable for said $4^{th}$ Stage to comprise of the following: A stage, wherein 1 or more mobile VOD terminals access said wireless Internet site;

A stage, wherein open/not open is determined for the channel shooting in real time and, in case of Not Open, the password value is entered;

A stage, wherein the streaming links created on said wireless Internet site page are selected;

A stage, wherein the streaming request signals for the moving pictures that are being shot in real time at the applicable channel on said wireless Internet page are transmitted to the Server;

And a step, wherein said streaming server performs streaming the applicable moving picture data to said mobile VOD terminal.

Also, in a remote monitoring method of an embodiment of the present invention that uses a mobile terminal, it is desirable that said application is pre-set in such a way that N (N is an integer greater than 1) cameras are used to comprise N channels, N channels are configured to form N streaming files as the Group 1 in said $4^{th}$ Stage, and one of the channels configured as said Group 1 is streamed with a mobile terminal by means of selection from the mobile terminal side.

On another note, in another embodiment, it is also desirable that said application is pre-set in such a way that N (N is an integer greater than 1) cameras are used to comprise N channels, N channels are configured to form N streaming files as the Group 1 in said $4^{th}$ Stage, and one of the channels configured as said Group 1 is streamed with a mobile terminal by means of a selection from the computer side.

And the shooting object of said camera can be one or more of pet animals (Pet Care), toddlers or kids (Kids Care), small stores or convenience stores (Store Surveillance), and individuals (Personal Casting).

Also, the system of an embodiment of the present invention is a system that remotely monitors the moving pictures being shot by 1 or more web cameras installed on the unit computer by streaming them in real time through the mobile communications network subscriber's mobile terminal, wherein it is comprised of the following:

A Server with an embedded remote monitoring application module that creates a wireless Internet page having streaming links;

A unit computer and a collection of unit computers that generate the original moving picture data by shooting the objects after executing said remote monitoring application;

A streaming server that registers the streaming file of the original moving picture data created in said computer by real-time encoding and transmits this to the terminal;

And mobile communications network subscriber's streaming-enabled mobile VOD terminal and a collection of terminals that receive the moving picture data in real time that are being shot at the moment through the wireless Internet page on said wireless Internet site from the streaming server.

Said remote monitoring application module of the system of an embodiment of the present invention will play a role of exposing the main screen player, which include the moving picture display domain of the object, channel title domain, channel screen quality set-up domain, menu domain, monitoring start/complete domain, channel information correction domain, open/not open change domain, etc., to said unit computer's monitor.

Furthermore, an embodiment of the system of an embodiment of the present invention includes the Management Server 1 that contains the database where the member subscribers' data and authentication information are stored, manages the member information, and takes authentication procedures based on the information managed, and the Management Server 2 that manages information for said wireless Internet page.

An embodiment of the system of an embodiment of the present invention is set in such a way that the unit computer is comprised of N (N is an integer greater than 1) channels using N web cameras.

According to another embodiment, an article of manufacture includes a computer-readable medium storing a computer program that is executable by a processor to remotely monitor moving pictures from a computer through a mobile terminal, by: exposing moving pictures of an object taken by 1 or more web cameras linked to said computer's monitor after implementing and initiating a remote monitoring application environment to said computer, enabling a wireless internet page on a remote monitoring service configured to provide a website to be created after registering the moving pictures file to a streaming server and creating a streaming link to stream the moving pictures on said wireless internet page, and streaming of said moving pictures in real time to one or more mobile VOD terminals configured to access said service configured to provide the web site as a streaming client, through said streaming link.

According to still another embodiment, an article of manufacture includes a computer-readable medium storing a computer program that is executable by a processor to stream moving pictures data to a mobile terminal in real time using a remote monitoring management server, by: creating a wireless internet page on a remote monitoring service configured to provide a website and a streaming link to stream said moving pictures on said wireless internet page using said management server, and transmitting the streaming of moving pictures data to said mobile terminal in real time when said mobile terminal accesses said service configured to provide the website and selects said streaming link, wherein said moving pictures are taken by executing a remote application installed in a computer and then encoded and transmitted in real time.

Figure 1:
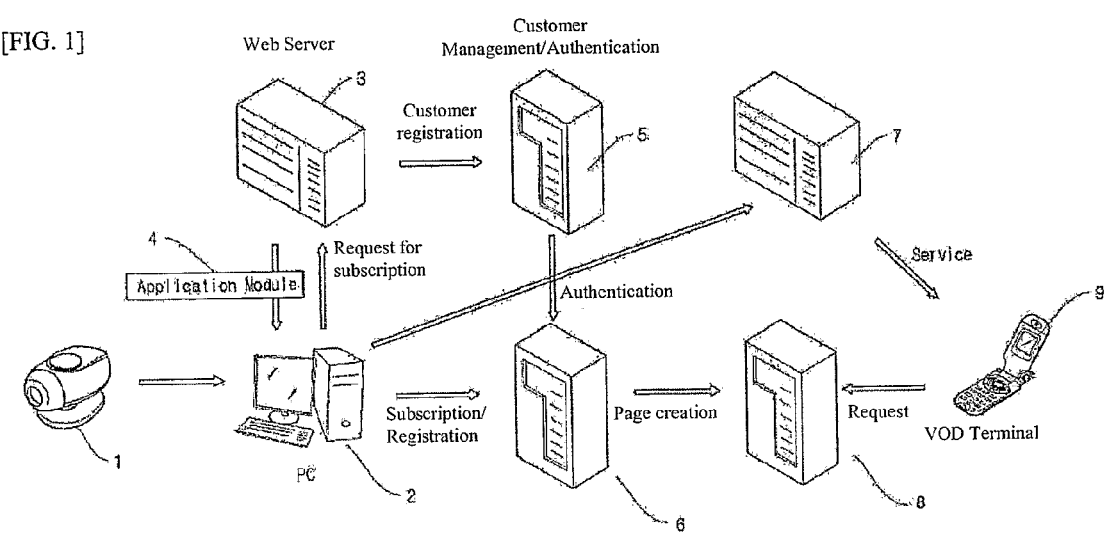
FIG. 1 is an overall configurational view of the system of an embodiment of the present invention.

The reference drawings above illustrate examples of the various embodiments. The technical ideas of the present invention are not limited to the facts illustrated in the drawings.

DESCRIPTION OF THE SYMBOLS FOR THE KEY PARTS OF THE DRAWINGS

1: Web Camera
2: PC
3: Web Server
4: Application Module
5: Management 1
6: Management 2
7: Streaming Server
8: Wireless Internet Server
9: Mobile VOD Terminal

DETAILED DESCRIPTION

The embodiments based on the present invention are attached and described below in detail. In describing the embodiments, in case any matter such as a publicly disclosed function or construction that is obviously clear to whomever is familiar with this field, a detailed description of the matter shall be omitted.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a system that implements the remote monitoring method of an embodiment of the present invention illustrating an outline of the unit computer inside the system comprising Web Camera (1), a unit computer PC (2), Web Server (3) of the Internet website, Application Module (4), Management Server 1 (5), Management Server 2 (6), Streaming Server (7), Wireless Internet Server (8) and mobile communications network subscriber's Mobile VOD Terminal (9).

Using the Internet, the PC (2) user accesses the website (wireless Internet site) that provides the service of an embodiment of the present invention and subscribes to the membership by the program stored in the Web Server (Server for the wireless Internet site) (3) in accordance with the process already designated. The Management Server 1 (5) connected to said Web Server (3) builds the database of the members and authenticates based on the database.

The PC (2) user downloads the Application Module (4) for remote monitoring from the application download page on the website and takes steps for installation in accordance with the installation method of the Application Module (4). Other than such an installation method, a method using the recording medium that stores the application module is also available.

The Application Module (4) must be executed in order for the PC (2) to perform monitoring broadcasting. At this time, 1 or more Web Cameras (1) installed to the PC (2) take moving pictures of the object in real time sending the original data to the PC (2). After receiving the authentication information from the Management Server 1 (5) to register the original data of the moving picture sent from PC (2), Management Server 2 (6) creates a wireless Internet page for remote monitoring on said website.

On another note, the PC (2) performs encoding (Encoding) in real time of the original data (video/audio source) of the moving picture that is taken by the camera in accordance with the Application Module (4), sending it to the Streaming Server (7). The Streaming Server (7) allows the mobile VOD terminal to receive a streaming service by accessing the wireless Internet page.

And when a mobile communication subscriber accesses the website using his/her Mobile VOD Terminal (9) and selects the streaming link that is linked to said wireless Internet page, the mobile terminal of the streaming client accesses the Streaming Server (7), and remote monitoring is performed in real time by the applicable terminal. The mobile terminal (9) accesses the servers in the system using the wireless Internet browser already installed inside the terminal and sends the data request messages. At this time, responsible for protocol conversion between the wireless Internet communication protocol for communicating with the browser and the standard HTTP and TCP/IP used for communicating with the servers, the Wireless Internet Server (8) converts the contents in the servers into an appropriate script format as requested by the browser and plays a role as a gateway in charge of encoding (Encoding) and decoding (Decoding) during communication between the terminal and the servers.

On another note, upon receiving the data request signals from the Mobile VOD Terminal (9), said Management Server 1 (5) checks registration Y/N of the subscriber from the database, performs authentication and forwards the result to the Management Server 2 (6), through which it decides streaming Y/N to the terminal. Then, the wireless terminal of the mobile communications network subscriber regenerates video and audio signals based on MPEG-4 technology taking MPEG-4 VOD Standard Platform as the foundation.

Maintaining the subscriber database, said Management Server 1 (5) performs login authentication on the website and login authentication from the mobile terminal (9) side to the wireless Internet server. The Management Server 2 (6) is separated in terms of its function in that it is a management server for creating and managing the wireless Internet page to which the moving pictures are linked but a consolidated management is also possible. However, it is not separated in an embodiment (remote monitoring method) for convenience's sake.

Detailed system management and application configuration will be approached with an embodiment of remote monitoring method described below. At this point, we would like to add that each network must be separately equipped with said Wireless Internet Server (8), even though it is not distinguished whether the mobile communication subscriber's network is CDMA network or GSM network, and a network must be designated or it will be designated automatically when setting the application module environment.

On another note, it was described earlier based on the unit computer. However, the system of an embodiment of the present invention will form a set, comprising numerous unit computers. The mobile terminal can be understood as a widespread group of terminals that remotely monitors the moving pictures taken at each unit computer. In other words, the computer at Place 1 where the moving pictures are taken and the mobile terminal at Place 2 where the moving pictures are streaming-enabled will have a relative meaning in the system of an embodiment of the present invention. A group of computers is constituted inside the system network comprising N (N is an integer greater than 1) computers that take the moving pictures and a group of mobile terminals is constituted comprising M (M is an integer greater than 1) streaming-enabled mobile terminals. Thus, the geographical concept of each terminal (computer/mobile terminal) in the entire system extends to Place 1, Place 2, Place 3, . . . Place K (K is an integer greater than 1).

For example, even when a mobile VOD terminal $M_1$ is monitoring the moving pictures taken at computer $N_1$ (In this case, the monitoring channel also expands by as many as the number of web cameras connected to a unit computer $N_1$), another mobile terminal $M_2$ can monitor the moving pictures of the computer $N_1$ in real time and each mobile terminal (M) can also monitor the motion pictures of the other computer $N_2$, which is not $N_1$. Accordingly, it becomes possible to continue to extend the place of taking the motion pictures and the place of monitoring the motion pictures. Based on this, the geographical concept described above will be extended at least by as many as the sum of the number of the unit computers in this system and the number of mobile VOD terminals. Of course, since a mobile VOD terminal is a mobile device inside the mobile communications network, such extendibility will systematically support remote monitoring regardless of time, situation or place.

Figure 2:
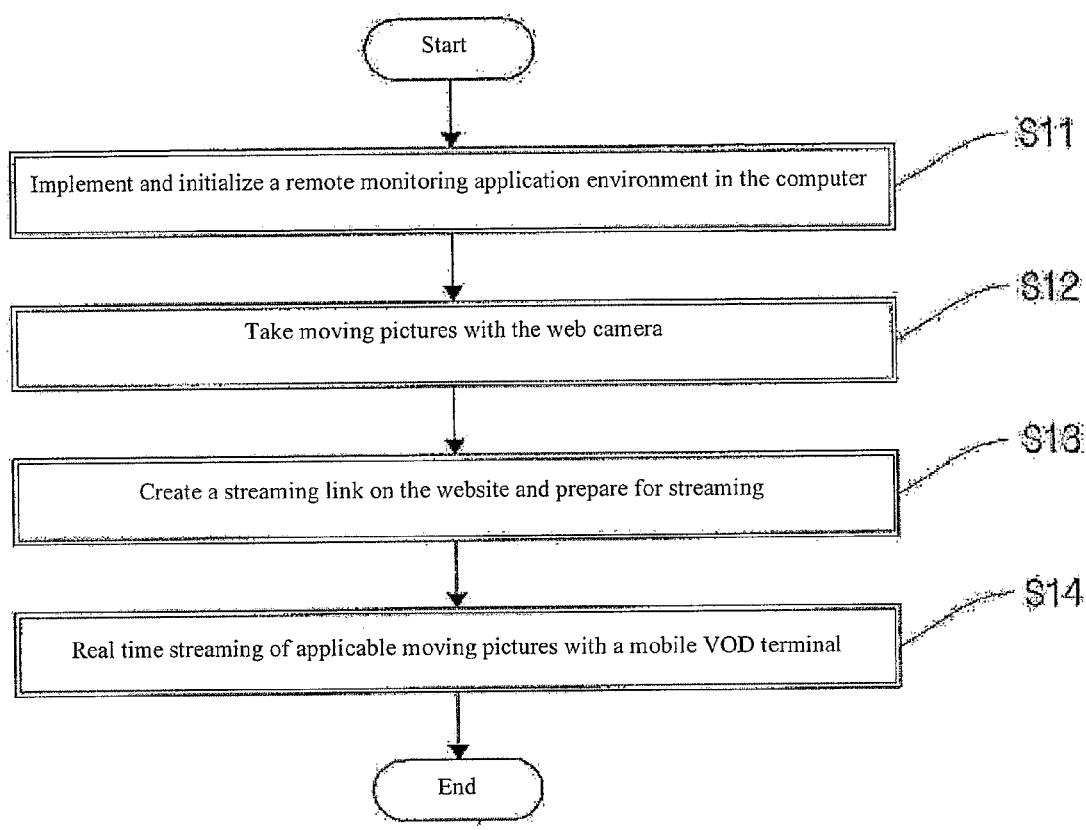
FIG. 2 is a flow chart in accordance with one embodiment of the present invention.
Figure 3:
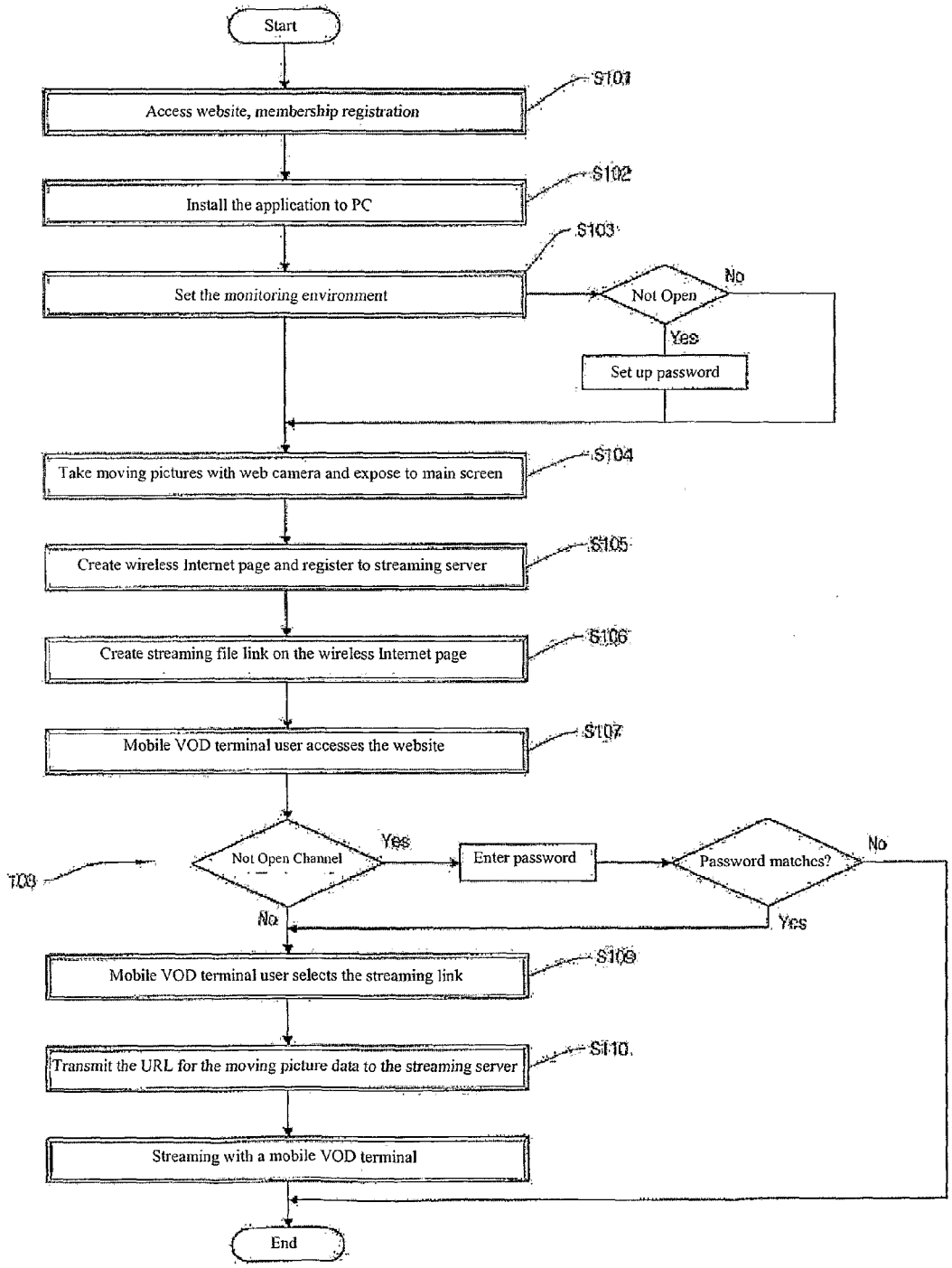
FIG. 3 is a flow chart that illustrates the configuration on FIG. 2 in more detail.

FIG. 2 illustrates an outline of remote monitoring process in accordance with one embodiment of the present invention from S11 to S14. FIG. 3 illustrates the process of FIG. 2 in more detail. We will now describe the process of FIG. 2 in connection with FIG. 3, a detailed embodiment of FIG. 2.

In order to remotely monitor through a mobile terminal, a remote monitoring application environment is implemented into the computer and an initialization step (S11) is taken in advance.

To begin with, in said step S11, a service subscriber performs membership registration (S101) by entering the membership information and password in accordance with the procedures already set on the website that provides the service. At this time, the membership registration procedure includes the membership registration of the mobile communication subscribers who use the mobile terminal such as a cellular phone and PDA as well as the membership registration of the PC users taking the moving pictures of the object.

Next, the subscriber downloads the remote monitoring application software embedded on the application download page of the website to store it on the PC or installs (S102) said application in the computer through various recording media (CD, DVD, memory stick, etc.) where the remote monitoring application software is stored.

After said application is executed, designated authentication procedures are taken and monitoring environment is set (S103). At this time, the user is supposed to set the open/not open environment for the picture-taking channel (one monitoring channel is formed per camera), name of the channel, the network selection (CDMA network or GSM network), picture quality of the channel, channel addition omission change, etc. In case the channel environment is set as Not Open, a password will be selected.

Next, the moving pictures of the object are taken with 1 or more web cameras connected to the unit computer, which will be exposed to the computer monitor (S12).

Figure 4:
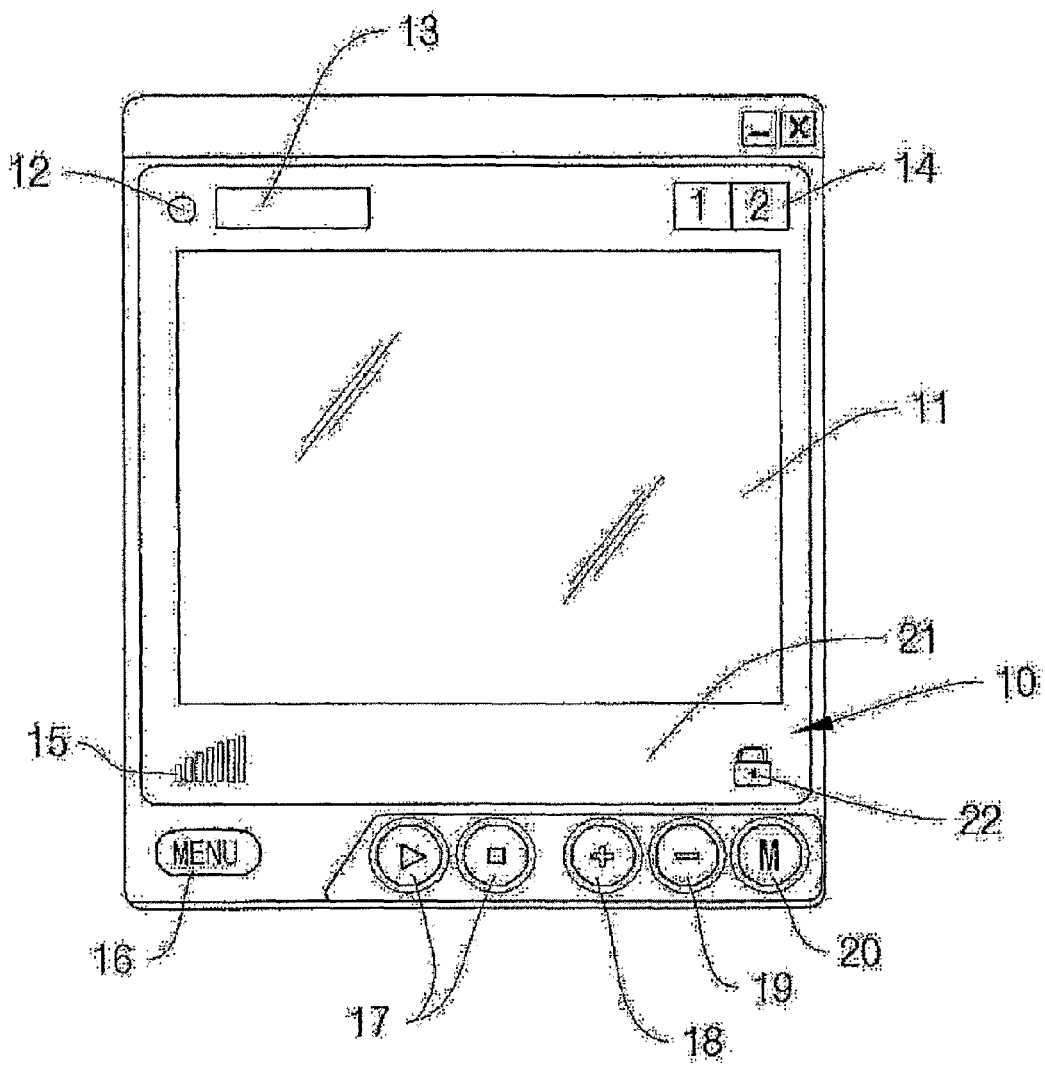
FIG. 4 illustrates an example of the main screen player of an embodiment of the present invention.

A more detailed description of said S12 procedure is as follows: The moving pictures of the object are taken in real time to generate the digital video/audio source. And it is converted into a streaming format through a real-time encoding (Encoding), and the main screen player (10) is exposed to the computer monitor (S104). As illustrated in FIG. 4, the main screen player (10) contains the moving picture display domain (11) that displays the moving pictures of the object being remotely monitored through a cellular phone, a broadcasting lamp (12) that displays (Y/N) whether or not the monitoring is being broadcast at the present time, and flashes upon commencement of monitoring, and otherwise indicates that the monitoring is not on the air, the channel title domain (13), channel selection button (14) that selects the channel while displaying the total number of channels, picture quality set-up domain (15) that allows selection out of high, medium, and low picture quality, menu domain (16), monitoring start/complete domain (17) that transmits monitoring commencement and completion signals, channel addition domain (18), channel omission domain (19), channel information correction domain (20), title display domain (21) for the channel currently being monitored, and open/not open change domain (22).

Said application is set in advance in such a way that N channels are configured with the N (N is an integer greater than 1) web cameras per unit computer, which is the same as what was described before. N streaming files can be made into a Group 1 by configuring N channels in said step S104. And taking into account the costs and reality as much as possible, it is prearranged so that the application allows the addition of up to 3 channels by installing up to 3 cameras. Then, the number of channels is displayed on the main screen player (10) through said selection button (14). Of course, theoretically, it is possible to install 4 or more cameras and there is no technical limitation in such installation. However, due to economic limitations, it may not be desirable for a remote monitoring method in a personal environment of one embodiment of the present invention, from the standpoint of costs and system operation.

The subscriber from the PC side can select and set one of the channels configured as Group 1 that can perform streaming with a cellular phone through said channel selection button (14), channel addition domain (18) or channel omission domain (19) or through the detailed item in the menu domain (16).

Also, one way of enabling the mobile terminal users to select the channel is to create the streaming play list with as many as the number of channels that is linked to the wireless Internet page on the website and to allow the mobile terminal user to select the desired channel link.

Next, streaming link is created on the service providing the website to get the streaming ready (S13).

More specifically, in said step S13, a wireless Internet page is created on the website and the moving pictures being taken are registered on the streaming server (S105). In other words, in said step S104, original source of the moving pictures being taken by the web camera is created in accordance with the application, conversion of the moving picture source taken to a streaming format is prepared; communication is connected with the management server, and the moving picture source is converted to a streaming format through real-time encoding, which is transmitted to the streaming server. The streaming server sends the streaming data to the mobile VOD terminal.

And the streaming file links for applicable media are created (S106) on said wireless Internet page to enable the streaming client to access the website and get streaming service.

Next, 1 or more mobile VOD terminals access said website as the streaming client and receive streaming service for the moving picture of said objects in real time (S14).

More specifically, in said step S14, the mobile VOD terminal user, a subscriber of mobile communications network, accesses the website as streaming client through wireless Internet (S107). At this time, the subscriber of mobile communications network accesses each Server inside the system using the wireless Internet browser already installed in the terminal and transmits the data request messages, when the Wireless Internet Server (8) plays a role as a gateway.

Next, whether applicable channel is Open or Not Open is determined from the mobile terminal side. In said step S103, if it was already set as Not Open from the PC side, the password is supposed to be entered. If the password does not match the one stored in step S103, the process is terminated. If matched, the next step is taken (S108).

Next, the mobile terminal user selects the streaming link generated on said wireless Internet page (S109) and, once applicable link is selected, the streaming request signal is transmitted to the streaming server (S110) as the URL for the moving picture data being taken at applicable channel on the wireless Internet page is sent in real time.

Accordingly, a particular streaming channel is formed and the stored moving picture file is transmitted to the mobile communication subscriber's mobile terminal through applicable streaming channel, streamed to the terminal and regenerated at the display part (S111). In the end, remote monitoring of the situation being shot by the PC camera by a mobile terminal such as a cellular phone or PDA is enabled. At this time, the moving pictures on the main screen exposed on the PC monitor match with the moving pictures monitored on the display part of the mobile terminal in real time.

Figure 5:
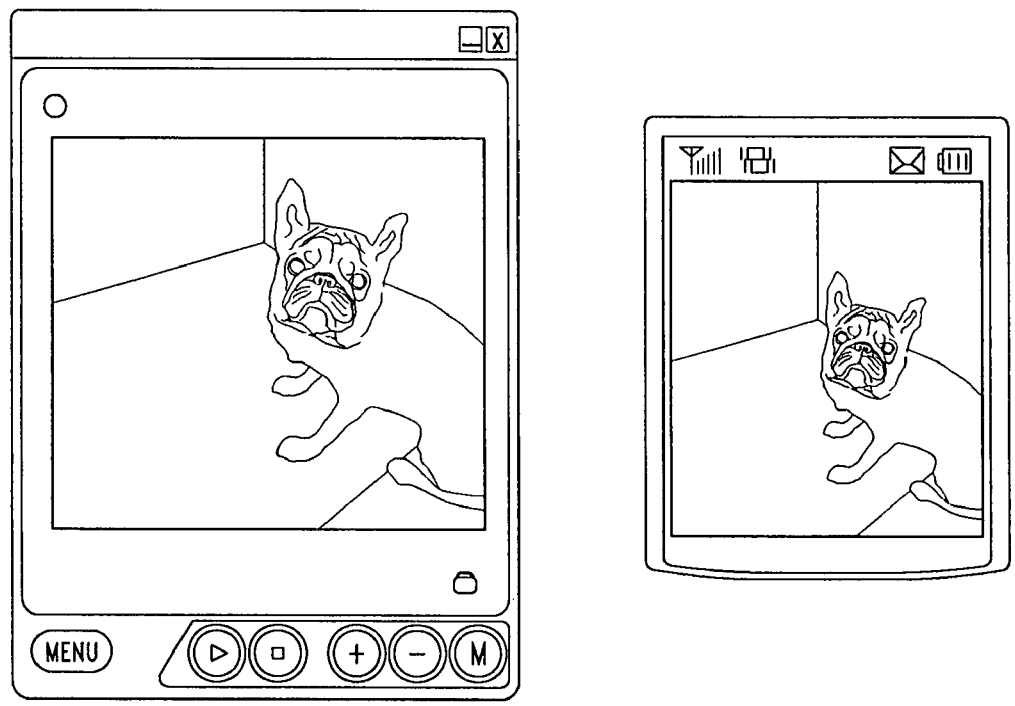
FIG. 5 is a drawing of one embodiment of the present invention.

FIG. 5 illustrates an embodiment that adopts the service of an embodiment of the present invention for Pet Care. As described earlier, it is possible to monitor the pet's image in real time with a cellular phone through a camera linked to the PC being installed at the place where the pet stays. This meets the user's desire to see the pet anytime and anywhere.

Figure 6:
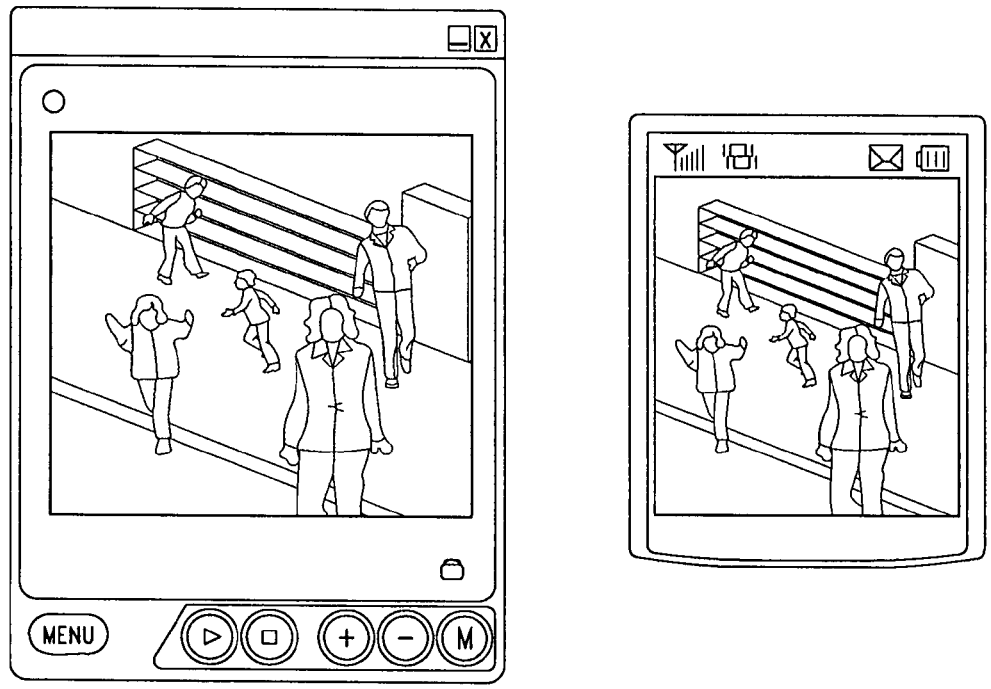
FIG. 6 is a drawing of another embodiment of the present invention.

FIG. 6 illustrates an embodiment that adopts the service of an embodiment of the present invention for Kids Care.

As described earlier, it is possible to monitor the kids' images or situation in real time with a cellular phone through a camera installed at the kindergarten or kids' playroom. For example, if the master of a Taekwondo Martial Art Studio installs a camera at the studio, takes the moving pictures of the kids practicing, and transmits them to the streaming server on the website, their parents can monitor it by using their cellular phones.

Figure 7:
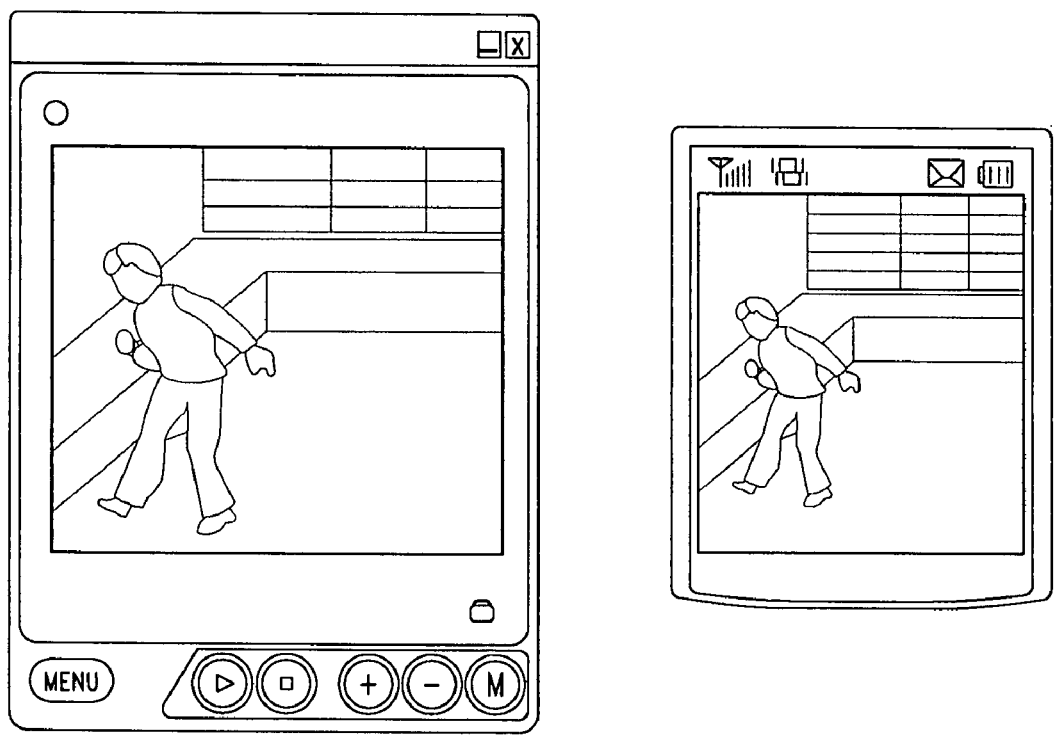
FIG. 7 is a drawing of another embodiment of the present invention.

FIG. 7 illustrates an embodiment that adopts the service of an embodiment of the present invention for Store Surveillance. It enables the owner or employee of a small store or convenience store to check the current situation inside the store with a cellular phone in real time.

Figure 8:
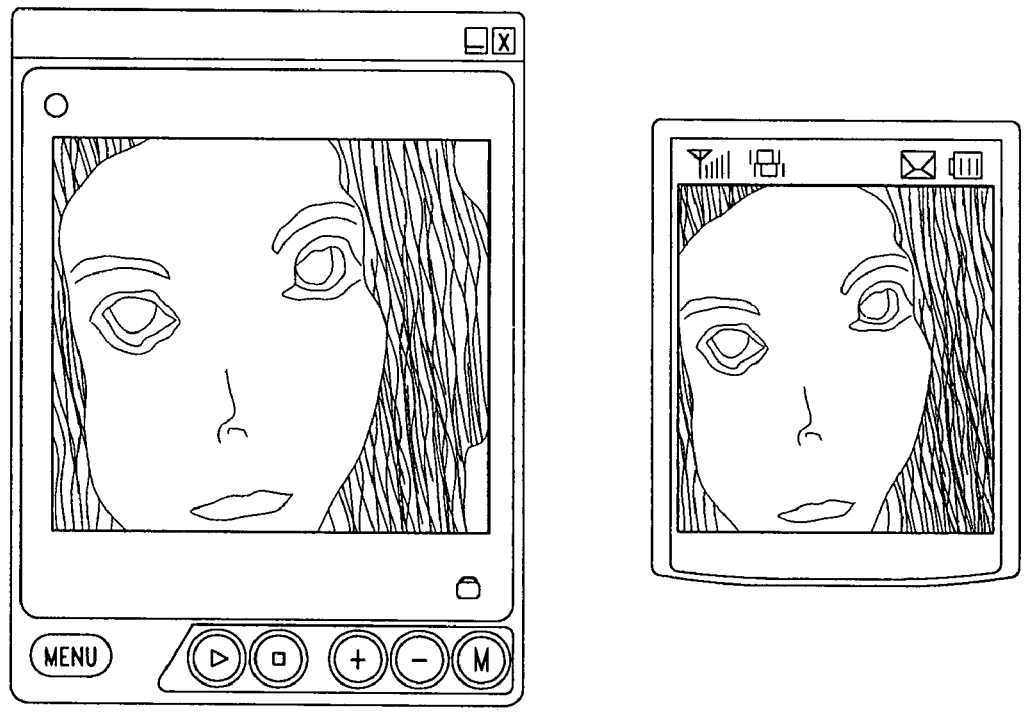
FIG. 8 is a drawing of another embodiment of the present invention.

FIG. 8 illustrates an embodiment that adopts the service of an embodiment of the present invention for Personal Casting. The subscriber executes the application module in front of the web camera and proceeds with a music broadcasting in accordance with the process described in detail. Then, another subscriber using a mobile communication terminal accesses the Internet website that provides the service of an embodiment of the present invention through the wireless Internet and becomes streaming-enabled for applicable music broadcasting through the streaming server.

Once again, it is important to add that those embodiments—those suggested in FIG. 5~FIG. 8 in particular—are mere examples of the present invention. The scope of the protection of the present invention shall not be limited by these embodiments.

Various technical standards are available for use in the monitoring method and system of the embodiments of the present invention, and it is easy to substitute and change the technical means to provide various additional embodiments. The scope of protection of the present invention shall not be limited by such obvious change or substitution.

According to the invention that has been described so far, it is possible to monitor the moving pictures being taken (Live Casting) by the web camera in real time using a mobile terminal anytime, anywhere regardless of the distance to where the web camera is installed. Numerous computers and mobile terminals that take the moving pictures are related to extendibility (in particular, multiple channels are formed in each unit computer) inside the system of the present invention, which has an effect of extending the type of moving pictures that can be monitored at the mobile terminal.

Also, a technology is applied to enable a mobile communication subscriber to access the wireless Internet with his/her cellular phone and receive streaming of the moving pictures being monitored; easy accessibility is augmented for the users by using the easy-to-install web cameras and PCs while an application that has various convenience modules is used without requiring separate hardware devices, and high level of personal environment is implemented, which has an effect of enabling the users to easily install and use.

Since creation and use of the contents occur in real time by the user as described, it has an advantage in that creating and using a variety of contents for monitoring—moving pictures for remote monitoring of the pets, store surveillance system, kid surveillance at the pre-school/kindergarten, and small-scale personal broadcasting—are possible.

Besides, the unique effect that occurs due to the unique configuration of the features of the embodiments of the present invention can be easily considered based on the disclosure herein. And we would like to add that the effect of the present invention will be accepted more widely not only by the matters described in the embodiment and claims, but also by the effect that can be generated within the scope that can be easily considered and the possibility of the temporary advantages that contribute to the development of the industry.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example and in a manner consistent with the description above, software can be provided in the streaming server, at the client terminal, and/or at any other suitable network device(s) in the system. Such software or other computer program or machine-readable instruction can be stored on a computer-readable medium (or other machine-readable medium) at the network device(s) and executable by one or more processors. The various operations shown and described herein can be performed using said stored computer program(s) executed by said processor(s).

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

All of the international patent application(s), foreign patent(s), foreign patent application(s), and non-patent publication(s) referred to in this specification and/or listed in the Application Data Sheet, are incorporated herein by reference, in their entireties. Aspects of the embodiments can be modified, if necessary to employ concepts of the various patents, applications and publications to provide yet further embodiments.

What is claimed is:

1. A method for remotely monitoring moving pictures from a computer through a mobile terminal, the method comprising:
   (a) exposing moving pictures of an object taken by 1 or more web cameras linked to said computer's monitor after implementing and initiating a remote monitoring application environment at said computer;
   (b) enabling a wireless internet page on a remote monitoring service configured to provide a website to be created after registering a file of the moving pictures to a streaming server and creating a streaming link on the wireless internet page to stream the moving pictures; and
   (c) streaming said moving pictures in real time to one or more mobile video on demand (VOD) terminals, configured to access said service configured to provide the website, as a streaming client, through said streaming link, wherein said (c) includes:
   said one or more mobile VOD terminals accessing said service configured to provide the website;
   determining an open/not open condition of a channel that is taking the moving pictures in real time and, in case of the not open condition, entering a password;
   selecting the streaming link on the wireless internet page of said service configured to provide the website;
   transmitting, to the streaming server, a streaming request signal to request the moving pictures being taken in real time at the channel; and
   said streaming server performing streaming of said moving pictures to said one or more mobile VOD terminals.

2. The method for remotely monitoring in claim 1, wherein said (a) includes:
   registering a member of said remote monitoring service configured to provide the website in accordance with a designated procedure;
   downloading a remote monitoring application software into said computer from said service configured to provide the website, which has said remote monitoring application software or installing said remote monitoring application software to said computer using a recording medium configured to store said remote monitoring application software; and
   executing said remote monitoring application software and setting said remote monitoring application environment.

3. The method for remotely monitoring in claim 2, wherein said remote monitoring application environment is set with an option to set Y/N the open/not open condition.

4. The method for remotely monitoring in claim 1, wherein said (a) includes:
   generating digital video/audio sources by taking said moving pictures of said object in real time and converting into a streaming format by real-time encoding; and
   exposing the taken moving pictures to said computer's monitor by executing a main screen player, which contains one or more of a moving picture display domain of an object being taken in real time, channel title domain, channel screen quality set-up domain, menu domain, monitoring start/complete domain, channel information correction domain, and an open/not open change domain.

5. The method for remotely monitoring in claim 1, wherein said remote monitoring application environment is pre-set in such a way that N, N is an integer greater than 1, channels are configured with N cameras; and
   wherein in said (c), N channels are configured to form N streaming files as Group 1; and
   one of the channels configured as the Group 1 is selected to be streamed by and to the one or more mobile VOD terminals.

6. The method for remotely monitoring in claim 1, wherein said remote monitoring application environment is pre-set in such a way that N, N is an integer greater than 1, channels are configured with N cameras; and
   wherein in said (c), N channels are configured to form N streaming files as Group 1; and
   one of the channels configured as the Group 1 is selected by the computer to be streamed to the one or more mobile VOD terminals.

7. The method for remotely monitoring in claim 1, wherein the object of the moving pictures that are taken by said camera is one or more of:
   pets, including for pet care,
   toddlers or kids, including for child care,
   small stores or convenience stores, including for store surveillance, and
   individuals, including for personal casting.

8. A remote monitoring system to stream moving pictures, taken by 1 or more web cameras installed in a computer at which a remote monitoring application environment is implemented, in real time through a mobile communications network subscriber's mobile terminal, the system comprising:
   a computer to take moving pictures of an object to generate original data of the moving pictures after execution of a remote monitoring application;
   a streaming server to register a streaming file of the original data of said moving pictures taken at said computer and which have been encoded in real time;
   a management server to enable a wireless internet page to be created on a remote monitoring service configured to provide a website, and then to create a streaming link to stream said moving pictures on said wireless internet page; and
   the mobile communications network subscribers' mobile terminal to receive said moving pictures in real time from the streaming server through said streaming link, wherein to said receive the moving pictures:
   the mobile terminal accesses said service configured to provide the website;
   the mobile terminal determines an open/not open condition of a channel that is taking the moving pictures in real time and, in case of the not open condition, enters a password;
   the mobile terminal selects the streaming link on the wireless internet page of said service configured to provide the website;
   the mobile terminal transmits, to the streaming server, a streaming request signal to request the moving pictures being taken in real time at the channel; and
   the streaming server streams the moving pictures to the mobile terminal.

9. The remote monitoring system in claim 8, wherein said remote monitoring application is configured to expose to a monitor of the said computer a main screen player, which includes one or more of a moving picture display domain of said object, channel title domain, channel screen quality set-up domain, menu domain, monitoring start/complete domain, channel information correction domain, an open/not open change domain.

10. The remote monitoring system in claim 8, wherein the management server includes:
   a first management server to include a database configured to store data of membership subscribers of said service configured to provide the website and authentication information, to manage the membership data, and to perform authentication usable to process in accordance with the managed membership information; and
   a second management server to manage information about said wireless internet page.

11. A remote monitoring system in claim 8, wherein N, N is an integer greater than 1, channels for the computer can be configured using N web cameras.

12. A remote monitoring system, comprising:
   a management server for making moving pictures data to be streamed to a mobile terminal in real time;
   wherein said management server includes:
      means for enabling a wireless internet page to be created on a remote monitoring service providing a website; and
      means for creating a streaming link for streaming said moving pictures on said wireless internet page, wherein the streaming of the moving pictures is received by said mobile terminal in real time if said mobile terminal accesses said service providing the website and selects said streaming link;
   a streaming server at which said moving pictures are to be registered, wherein said streaming server is configured to provide said moving pictures to said mobile terminal if said mobile terminal selects said streaming link, wherein to provide said moving pictures:
   the mobile terminal determines an open/not open condition of a channel that is taking the moving pictures in real time and, in case of the not open condition, enters a password;
   the mobile terminal selects the streaming link on the wireless internet page of said service providing the website;
   the mobile terminal transmits, to the streaming server, a streaming request signal to request the moving pictures being taken in real time at the channel; and
   the streaming server streams the moving pictures to the mobile terminal.

13. A management server used in a remote monitoring system, the management server comprising:
   means for enabling a wireless internet page to be created on a remote monitoring service providing a website; and
   means for creating a streaming link for streaming moving pictures on said wireless internet page,
   wherein said moving pictures are taken by executing a remote monitoring application installed in a computer and then transmitted in real time, and wherein the streaming of moving pictures is received in real time by a mobile terminal that accesses said service providing the website and that selects said streaming link, wherein to said receive the streaming of the moving pictures:
   the mobile terminal determines an open/not open condition of a channel that is taking the moving pictures in real time and, in case of the not open condition, enters a password;
   the mobile terminal selects the streaming link on the wireless internet page of said service providing the website;
   the mobile terminal transmits to a streaming server, a streaming request signal to request the moving pictures being taken in real time at the channel; and
   the streaming server streams the moving pictures to the mobile terminal.

14. A mobile terminal used in a remote monitoring system, the mobile terminal comprising:
   a browser to select a streaming link to stream taken moving pictures and to receive the streaming of moving pictures by accessing a remote monitoring service configured to provide a web site,
   wherein said moving pictures are taken via execution of a remote monitoring application installed in a computer and then transmitted in real time, and a wireless internet page on said service configured to provide the website is created by a management server, and said streaming link, on said wireless internet page, is created by said management server, and further wherein:
   the mobile terminal accesses said service configured to provide the website;
   the mobile terminal determines an open/not open condition of a channel that is taking the moving pictures in real time and, in case of the not open condition, enters a password;
   the mobile terminal selects the streaming link on the wireless internet page of said service configured to provide the website;
   the mobile terminal transmits, to a streaming server, a streaming request signal to request the moving pictures being taken in real time at the channel; and
   the streaming server streams the moving pictures to the mobile terminal.

15. A computer used in a remote monitoring system, the computer comprising:
   at least one web camera to take moving pictures;
   a remote monitoring application to enable said moving pictures to be taken and to encode the taken moving pictures in real time; and
   transmission means for transmitting said moving pictures in real time,
   wherein said moving pictures are transmitted in real time to a mobile terminal that accesses a remote monitoring service configured to provide a website and that selects a streaming link to stream said moving pictures, and wherein a wireless internet page on said service configured to provide a website is created by a management server, and said streaming link, said wireless internet page, created by said management server, and further wherein:
   the mobile terminal determines an open/not open condition of a channel that is taking the moving pictures in real time and, in case of the not open condition, enters a password;
   the mobile terminal transmits, to a streaming server, a streaming request signal to request the moving pictures being taken in real time at the channel; and
   the streaming server streams the moving pictures to the mobile terminal.

16. A remote monitoring method for streaming moving pictures data to a mobile terminal in real time using a remote monitoring management server, the method comprising:
   creating a wireless internet page on a remote monitoring service configured to provide a website and a streaming link to stream said moving pictures on said wireless internet page using said management server; and streaming the moving pictures to said mobile terminal in real time if said mobile terminal accesses said service configured to provide the website and selects said streaming link, wherein said moving pictures are taken by executing a remote application installed in a computer and then encoded and transmitted in real time, and further wherein:

the mobile terminal determines an open/not open condition of a channel that is taking the moving pictures in real time and, in case of the not open condition, enters a password;

the mobile terminal transmits, to a streaming server, a streaming request signal to request the moving pictures being taken in real time at the channel; and the streaming server streams the moving pictures to the mobile terminal.

* * * * *

UNITED STATES PATENT AND TRADEMARK OFFICE
CERTIFICATE OF CORRECTION

| | | |
|---|---|---|
| PATENT NO. | : 8,089,520 B2 | Page 1 of 1 |
| APPLICATION NO. | : 11/884193 | |
| DATED | : January 3, 2012 | |
| INVENTOR(S) | : Kwang-jin Ko et al. | |

It is certified that error appears in the above-identified patent and that said Letters Patent is hereby corrected as shown below:

Column 12, lines 34-35, "A remote monitoring system to stream moving pictures, taken" should read --A remote monitoring system to stream moving pictures, being taken--.

Column 14, line 51, "server, and said streaming link, said wireless internet" should read --server, and said streaming link, on said wireless internet--.

Column 14, line 52, "page, created by said management server, and further" should read --page, is created by said management server, and further--.

Signed and Sealed this
Twentieth Day of March, 2012

David J. Kappos
*Director of the United States Patent and Trademark Office*